United States Patent
Xu et al.

(10) Patent No.: US 9,682,714 B2
(45) Date of Patent: Jun. 20, 2017

(54) SWITCHING CIRCUIT FOR IMPLEMENTING COUPLING AT RANDOM END OF TRAIN

(71) Applicant: CRRC QINGDAO SIFANG CO., LTD., Qingdao, Shandong (CN)

(72) Inventors: Qiang Xu, Shandong (CN); Jinghai Jiao, Shandong (CN); Huiqing Zhang, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/120,474

(22) PCT Filed: Oct. 29, 2015

(86) PCT No.: PCT/CN2015/093221
§ 371 (c)(1),
(2) Date: Aug. 19, 2016

(87) PCT Pub. No.: WO2016/082651
PCT Pub. Date: Jun. 2, 2016

(65) Prior Publication Data
US 2017/0066455 A1     Mar. 9, 2017

(30) Foreign Application Priority Data

Nov. 27, 2014 (CN) .......................... 2014 1 0699048
Nov. 27, 2014 (CN) .......................... 2014 2 0726661

(51) Int. Cl.
*B61C 17/00* (2006.01)
*B60L 5/24* (2006.01)

(52) U.S. Cl.
CPC ................ *B61C 17/00* (2013.01); *B60L 5/24* (2013.01)

(58) Field of Classification Search
CPC ......... B61C 17/02; B61C 17/04; B61C 17/06; B61C 17/00; B60L 5/24
See application file for complete search history.

(56) References Cited

U.S. PATENT DOCUMENTS 2,721,932 A * 10/1955 Babcock ................. B61L 1/185
246/165
2001/0044695 A1* 11/2001 Doner ................. B61L 15/0027
701/482

(Continued)

FOREIGN PATENT DOCUMENTS

CN        2226292 Y     5/1996
CN     101980912 A      2/2011

(Continued)

OTHER PUBLICATIONS

International Search Report for PCT/CN2015/093221, mailed Jan. 29, 2016, ISA/CN.

(Continued)

*Primary Examiner* — Jason C Smith
(74) *Attorney, Agent, or Firm* — Yue Xu; U.S. Fairsky LLP

(57) ABSTRACT

A switching circuit for implementing coupling at a random end of a train includes a coupling change-over switch which includes a switching position, a normal position, and a disconnected position. The coupling change-over switch includes a group of terminals A, B, C, D, E, F, G, and H that are related to a train running direction signal. The terminals A and C are connected to each other, as well as the terminals E and G, the terminals B and H and the terminals D and F. The pair terminals A and C and the pair of terminals E and G act as terminals of forward and backward running signal train control lines respectively. The pair of terminals B and H and the pair of terminals D and F are connected to (Continued)

terminals of forward and backward running signal wires of a train electric coupler connector respectively.

9 Claims, 2 Drawing Sheets

(56) References Cited

U.S. PATENT DOCUMENTS

| | | | | |
|---|---|---|---|---|
| 2009/0248226 | A1* | 10/2009 | Kellner | B61C 17/12 |
| | | | | 701/19 |
| 2016/0075345 | A1* | 3/2016 | Sonnleitner | B61C 5/00 |
| | | | | 701/19 |
| 2016/0176415 | A1* | 6/2016 | Nalluri | B61D 17/00 |
| | | | | 105/392.5 |
| 2016/0297451 | A1* | 10/2016 | Schwab | B61C 5/00 |
| 2017/0066455 | A1* | 3/2017 | Xu | B60L 5/24 |

FOREIGN PATENT DOCUMENTS

| | | |
|---|---|---|
| CN | 201849491 U | 6/2011 |
| CN | 202413797 U | 9/2012 |
| CN | 103318193 A | 9/2013 |
| CN | 203391776 U | 1/2014 |
| CN | 103676876 A | 3/2014 |
| CN | 103770795 A | 5/2014 |
| CN | 104554300 A | 4/2015 |
| CN | 204279427 U | 4/2015 |
| GB | 387775 A | 2/1933 |
| GB | 1600333 A | 10/1981 |
| JP | 2001-233202 A | 8/2001 |

OTHER PUBLICATIONS

Liu, Shijie et al., Design of direction selection circuit for Singapore double energy battery electric locomotive, Electric Locomotives & Mass Transit Vehicles, Nov. 20, 2014, pp. 24-27, vol. 37 No. 6.

* cited by examiner

US 9,682,714 B2

SWITCHING CIRCUIT FOR IMPLEMENTING COUPLING AT RANDOM END OF TRAIN

This application is the national phase of International Application No. PCT/CN2015/093221, titled "CONVERSION CIRCUIT FOR IMPLEMENTING RECOUPLING OF RANDOM END OF TRAIN", filed on Oct. 29, 2015, which claims priority to Chinese Patent Application No. 201410699048.6 titled "SWITCHING CIRCUIT FOR IMPLEMENTING COUPLING AT RANDOM END OF TRAIN" and filed with the Chinese State Intellectual Property Office on Nov. 27, 2014, and to Chinese Patent Application No. 201420726661.8 titled "SWITCHING CIRCUIT FOR IMPLEMENTING COUPLING AT RANDOM END OF TRAIN" and filed with the Chinese State Intellectual Property Office on Nov. 27, 2014, which are incorporated herein by reference in their entirety.

FIELD

The present disclosure relates to the field of train circuit designing, and particularly to a switching circuit for implementing coupling at a random end of a train.

BACKGROUND

Currently, urban railway vehicles generally run with fixed formation, mainly including 6-car formation and 8-car formation. Running with fixed formation cannot meet flexible requirements of passenger flow volume. If vehicles are designed to have small formation, such as 3-car formation or 4-car formation, and the vehicles run with the fixed formation of 3-car or 4-car in a case of a small passenger flow volume and run with 2 or 3 coupled trains of 3-car formation or 4-car formation in a case of a large passenger flow volume, flexible requirements of passenger flow volume can be met to save power and costs.

In conventional technology, coupling of trains is commonly implemented as coupling at a fixed end. The coupling at a fixed end means that a head end of a train can only be coupled with a tail end of another train, which is inconvenient and time-consuming for coupling the trains.

Coupling at a random end is more convenient than the coupling at a fixed end in implementation. The coupling at a random end means that either ends of a train can be coupled with either ends of another train, which is convenient and time-saving for coupling the trains. However, it is difficult to design a control circuit for coupling at a random end. Therefore, it is desired to provide a switching circuit with which coupling at a random end of a train can be implemented.

SUMMARY

In view of the disadvantages of conventional technology, a switching circuit for implementing coupling at a random end of a train is provided according to the present disclosure, with which coupling at a random end of a train can be implemented.

To achieve the object above, technical solutions are provided as follows according to the present disclosure.

A switching circuit for implementing coupling at a random end of a train is provided, which includes a coupling change-over switch, where the coupling change-over switch includes a group of terminals A, B C, D, E, F, G and H relating to a train running direction signal. the terminals A and C are connected to each other, and act as a terminal of a forward running signal train control wire, the terminals E and G are connected to each other, and act as a terminal of a backward running signal train control wire, the terminals B and H in the coupling change-over switch are connected to each other, and are connected to a terminal of a forward running signal wire of a train electric coupler connector, and the terminals D and F in the coupling change-over switch are connected to each other, and are connected to a terminal of a backward running signal wire of the train electric coupler connector; and the coupling change-over switch has three positions including a switching position, a normal position and a disconnection position, the terminals C and D are connected to each other and the terminals G and H are connected to each other in a case that the coupling change-over switch is turned to the switching position, the terminals A and B are connected to each other and the terminals E and F are connected to each other in a case that the coupling change-over switch is turned to the normal position, and all of the terminals A, B C, D, E, F, G and H are disconnected in a case that the coupling change-over switch is turned to the disconnection position.

Preferably, the coupling change-over switch further includes a group of terminals I, J, K, L, M, N, O and P relating to a door opening signal, the terminals I and K are connected to each other, and act as a terminal of a left door opening train control wire, the terminals M and O are connected to each other, and act as a terminal of a right door opening train control wire, the terminals J and P in the coupling change-over switch are connected to each other, and are connected to a terminal of a left door opening signal wire of the train electric coupler connector, and the terminals L and N in the coupling change-over switch are connected to each other, and are connected to a terminal of a right door opening signal wire of the train electric coupler connector; and the terminals K and L are connected to each other and the terminals O and P are connected to each other in a case that the coupling change-over switch is turned to the switching position, the terminals I and J are connected to each other and the terminals M and N are connected to each other in a case that the coupling change-over switch is turned to the normal position, and all of the terminals I, J, K, L, M, N, O and P are disconnected in a case that the coupling change-over switch is turned to the disconnection position.

Preferably, the coupling change-over switch further includes a group of terminals Q, R, S, T, U, V, W and X relating to a door closing signal, the terminals Q and S are connected to each other, and act as a terminal of a left door closing train control wire, the terminals U and W are connected to each other, and act as a terminal of a right door closing train control wire, the terminals R and X in the coupling change-over switch are connected to each other, and are connected to a terminal of a left door closing signal wire of the train electric coupler connector, and the terminals T and V in the coupling change-over switch are connected to each other, and are connected to a terminal of a right door closing signal wire of the train electric coupler connector; and the terminals S and T are connected to each other and the terminals W and X are connected to each other in a case that the coupling change-over switch is turned to the switching position, the terminals Q and R are connected to each other and the terminals U and V are connected to each other in a case that the coupling change-over switch is turned to the normal position, and all of the terminals Q, R, S, T, U, V, W and X are disconnected in a case that the coupling change-over switch is turned to the disconnection position.

Preferably, the coupling change-over switch further includes several groups of terminals relating to directional control signals, and connections between the terminals in each of the groups and between the terminals and terminals of related signal wires of the train electric coupler connector are the same as the connections of the terminals in any one of the groups according to claims 1 to 3.

Preferably, the directional control signal includes a front pantograph control signal, a back pantograph control signal, a left train door all closed interlocking signal, a right train door all closed interlocking signal, a left train door zero speed signal and a right train door zero speed signal.

It follows from the above description that, in the switching circuit for implementing coupling at a random end of a train according to the present disclosure, a coupling change-over switch is provided to ensure that the forward running control wires and the backward running control wires of a host train and a counterpart train control the running directions of the coupled trains to be the same when the two trains are coupled at random ends of the two trains.

In the switching circuit for implementing coupling at a random end of a train according to the present disclosure, by providing the coupling change-over switch, it can be further ensured that directional train wires, such as left door opening control wires, left door closing control wires, right door opening control wires and right door closing control wires of a host train and a counterpart train can be connected correctly when the two trains are coupled at random ends of the two trains, and thus doors of the coupled trains can be opened or closed at a same side with respect to the running direction.

The circuit according to the present disclosure is simple in structure and convenient in operating, and is practical and reliable.

BRIEF DESCRIPTION OF THE DRAWINGS

The drawings to be used in the descriptions of embodiments or conventional technology are described briefly as follows, so that technical solutions according to the embodiments in the present disclosure or according to conventional technology may become clearer. Apparently, the drawings in the following descriptions only illustrate some embodiments in the present disclosure. For those skilled in the art, other drawings may be obtained based on these drawings without any creative work.

DETAILED DESCRIPTION

Technical solutions according to embodiments in the present disclosure are described clearly and completely hereinafter with reference to the drawings, so that the object, technical solutions and advantages of the embodiments may become clearer. Apparently, the described embodiments are only a few rather than all of the embodiments. Any other embodiments obtained by those skilled in the art based on the embodiments according to the present disclosure without any creative work fall in the scope of the present disclosure.

First Embodiment

A switching circuit for implementing coupling at a random end of a train is provided according to a first embodiment in the present disclosure, which includes a coupling change-over switch. The coupling change-over switch includes a group of terminals A, B C, D, E, F, G and H relating to a train running direction signal. The terminals A and C are connected to each other, and act as a terminal of a forward running signal train control wire. The terminals E and G are connected to each other, and act as a terminal of a backward running signal train control wire. The terminals B and H in the coupling change-over switch are connected to each other, and are connected to a terminal of a forward running signal wire of a train electric coupler connector. The terminals D and F in the coupling change-over switch are connected to each other, and are connected to a terminal of a backward running signal wire of the train electric coupler connector.

The coupling change-over switch has three positions including a switching position, a normal position and a disconnection position. The terminals C and D are connected to each other and the terminals G and H are connected to each other in a case that the coupling change-over switch is turned to the switching position. The terminals A and B are connected to each other and the terminals E and F are connected to each other in a case that the coupling change-over switch is turned to the normal position. All of the terminals A, B C, D, E, F, G and H are disconnected in a case that the coupling change-over switch is turned to the disconnection position.

Figure 1:
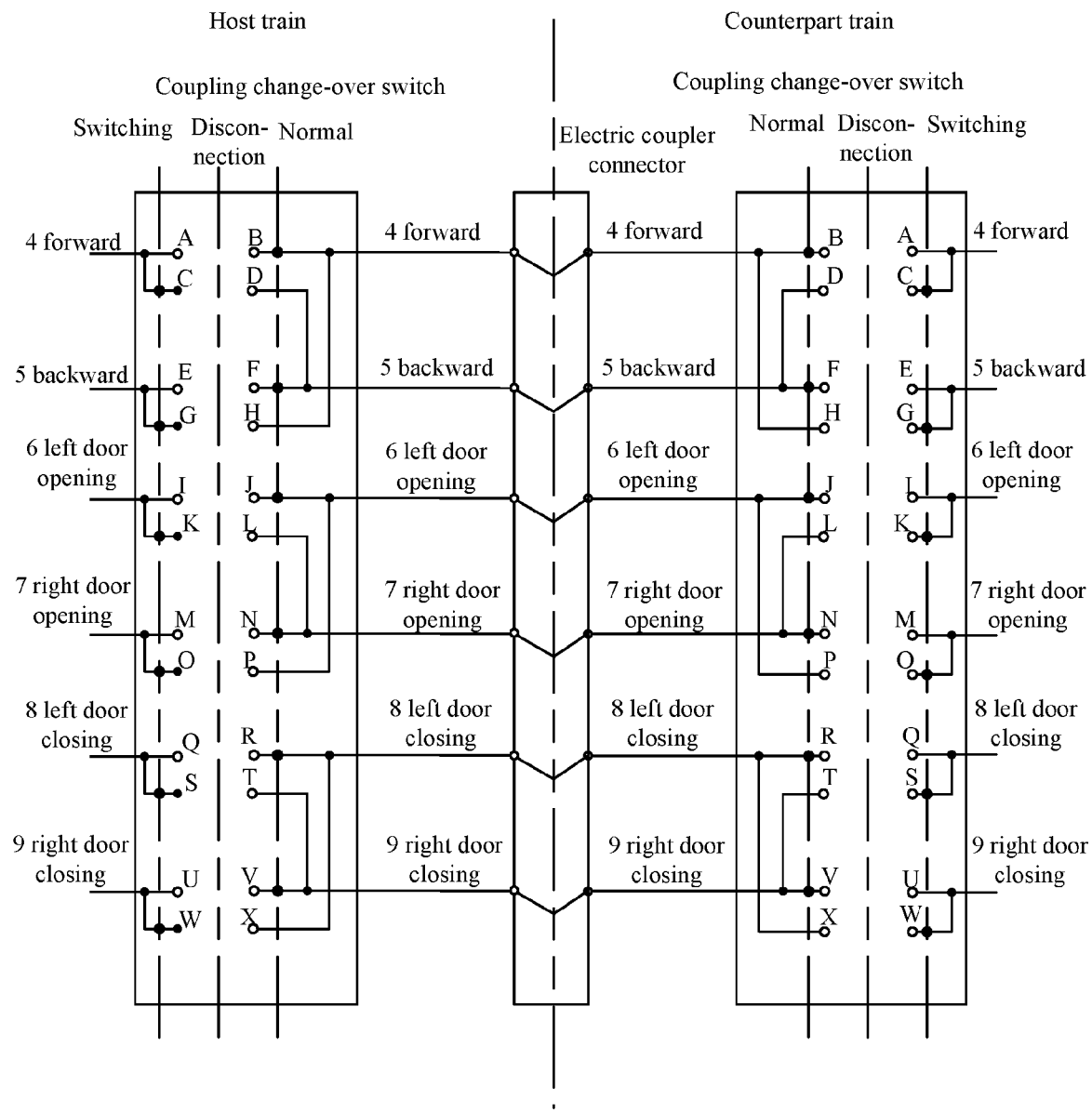
FIG. 1 is a schematic structural diagram of a switching circuit for implementing coupling at a random end of a train with train wires of directional signals of forward running direction, backward running direction, left door opening, right door opening, left door closing, and right door closing of the train according to an embodiment in the present disclosure.

The embodiment of a forward and backward running control switching circuit for coupling of trains is described with a specific example, for which reference is made to FIG. 1.

A forward running signal wire 4 and a backward running signal wire 5 each occupy two rows of terminals in the coupling change-over switch, and are connected to the terminals A, B, C, D, E, F, G and H, correspondingly. The terminals A and C are connected to each other, and act as a terminal of the forward running signal train control wire. The terminals E and G are connected to each other, and act as a terminal of the backward running signal train control wire. The terminals B and H in the coupling change-over switch are connected to each other, and are connected to the forward running signal wire of the train electric coupler connector. The terminals D and F in the coupling change-over switch are connected to each other, and are connected to the backward running signal wire of the train electric coupler connector.

In coupling trains for running, the coupling change-over switch of a master train (host train) is turned to the switching position and the coupling change-over switch of a non-master train (counterpart train) is turned to the normal position. In this way, the forward running signal wire 4 of the master train (host train) is connected to the backward running signal wire 5 of the non-master train (counterpart train), and the backward running signal wire 5 of the master train (host train) is connected to the forward running signal wire 4 of the non-master train (counterpart train), achieving exchange of forward running signals and backward running signals of the two trains, so that the two trains can run forward or backward together. Alternatively, the coupling change-over switch of a coupling end of the counterpart train is turned to a switching position and the coupling change-over switch of a coupling end of the host train is turned to the normal position, so that the forward running signal wire of the counterpart train is connected to the backward running signal wire of the host train, and the backward running signal wire of the counterpart train is connected to the forward running signal wire of the host train, unifying the running directions of the coupled trains.

In coupling of trains, if the terminals in the switches are connected correctly as shown in FIG. 1, the forward running direction control wires and the backward running direction control wires of the coupled trains can be connected correctly only by turning the coupling change-over switches to corresponding positions, which is simple in structure and convenient in operating.

Second Embodiment

A switching circuit for implementing coupling at a random end of a train is provided according to a second embodiment in the present disclosure, in which the coupling change-over switch further includes a group of terminals I, J, K, L, M, N, O and P relating to a door opening signal. The terminals I and K are connected to each other, and act as a terminal of a left door opening train control wire. The terminals M and O are connected to each other, and act as a terminal of a right door opening train control wire. The terminals J and P in the coupling change-over switch are connected to each other, and are connected to a terminal of a left door opening signal wire of the train electric coupler connector. The terminals L and N in the coupling change-over switch are connected to each other, and are connected to a terminal of a right door opening signal wire of the train electric coupler connector.

The terminals K and L are connected to each other and the terminals O and P are connected to each other in a case that the coupling change-over switch is turned to the switching position. The terminals I and J are connected to each other and the terminals M and N are connected to each other in a case that the coupling change-over switch is turned to the normal position. All of the terminals I, J, K, L, M, N, O and P are disconnected in a case that the coupling change-over switch is turned to the disconnection position.

The embodiment of a door opening control switching circuit for coupling of trains is described with a specific example, for which reference is made to FIG. 1.

A left door opening signal wire 6 and a right door opening signal wire 7 each occupy two rows of terminals in the coupling change-over switch, and are connected to the terminals I, J, K, L, M, N, O and P, correspondingly. The terminals I and K are connected to each other, and act as a terminal of the left door opening train control wire. The terminals M and O are connected to each other, and act as a terminal of the right door opening train control wire. The terminals J and P in the coupling change-over switch are connected to each other, and are connected to a terminal of the left door opening signal wire of the train electric coupler connector. The terminals L and N in the coupling change-over switch are connected to each other, and are connected to a terminal of the right door opening signal wire of the train electric coupler connector.

In coupling trains for running, the coupling change-over switch of a master train (host train) is turned to the switching position and the coupling change-over switch of a non-master train (counterpart train) is turned to the normal position. In this way, the left door opening wire 6 of the master train (host train) is connected to the right door opening wire 7 of the non-master train (counterpart train), and the right door opening wire 7 of the master train (host train) is connected to the left door opening wire 6 of the non-master train (counterpart train), achieving exchange of left door opening signals and right door opening signals of the two trains, so that the two trains can open left or right doors with respect to a running direction together. Alternatively, the coupling change-over switch of a coupling end of the counterpart train is turned to the switching position and the coupling change-over switch of a coupling end of the host train is turned to the normal position, so that, the left door opening wire of the counterpart train is connected to the right door opening wire of the host train, and the right door opening wire of the counterpart train is connected to the left door opening wire of the host train, unifying the sides of opened doors of the coupled trains with respect to the running direction.

In coupling of trains, if the terminals in the switches are connected correctly as shown in FIG. 1, the forward running direction control wires, the backward running direction control wires and the door opening control wires of the coupled trains can be connected correctly only by turning the coupling change-over switches to corresponding positions, which is simple in structure and convenient in operating.

Third Embodiment

A switching circuit for implementing coupling at a random end of a train is provided according to a third embodiment in the present disclosure, in which the coupling change-over switch further includes a group of terminals Q, R, S, T, U, V, W and X relating to a door closing signal. The terminals Q and S are connected to each other, and act as a terminal of a left door closing train control wire. The terminals U and W are connected to each other, and act as a terminal of a right door closing train control wire. The terminals R and X in the coupling change-over switch are connected to each other, and are connected to a terminal of a left door closing signal wire of the train electric coupler connector. The terminals T and V in the coupling change-over switch are connected to each other, and are connected to a terminal of a right door closing signal wire of the train electric coupler connector.

The terminals S and T are connected to each other and the terminals W and X are connected to each other in a case that the coupling change-over switch is turned to the switching position. The terminals Q and R are connected to each other and the terminals U and V are connected to each other in a case that the coupling change-over switch is turned to the normal position. All of the terminals Q, R, S, T, U, V, W and X are disconnected in a case that the coupling change-over switch is turned to the disconnection position.

The embodiment of a door closing control switching circuit for coupling of trains is described with a specific example, for which reference is made to FIG. 1.

A left door closing signal wire 8 and a right door closing signal wire 9 each occupy two rows of terminals in the coupling change-over switch, and are connected to the terminals Q, R, S, T, U, V, W and X, correspondingly. The terminals Q and S are connected to each other, and act as a terminal of a left door closing train control wire. The terminals U and W are connected to each other, and act as a terminal of a right door closing train control wire. The terminals R and X in the coupling change-over switch are connected to each other, and are connected to a terminal of a left door closing signal wire of the train electric coupler connector. The terminals T and V in the coupling changeover switch are connected to each other, and are connected to a terminal of a right door closing signal wire of the train electric coupler connector.

In coupling trains for running, the coupling change-over switch of a master train (host train) is turned to the switching position and the coupling change-over switch of a non-master train (counterpart train) is turned to the normal position. In this way, the left door closing wire 8 of the master train (host train) is connected to the right door closing wire 9 of the non-master train (counterpart train), and the right door closing wire 9 of the master train (host train) is connected to the left door closing wire 8 of the non-master train (counterpart train), achieving exchange of left door closing signals and right door closing signals of the two trains, so that the two trains can close left or right doors with respect to a running direction together. Alternatively, the coupling change-over switch of a coupling end of the counterpart train is turned to the switching position and the coupling change-over switch of a coupling end of the host train is turned to a normal position, so that the left door closing wire of the counterpart train is connected to the right door closing wire of the host train, and the right door closing wire of the counterpart train is connected to the left door closing wire of the host train, unifying the sides of opened doors of the coupled trains with respect to the running direction.

In coupling of trains, if the terminals in the switches are connected correctly as shown in FIG. 1, the forward running direction control wires, backward running direction control wires and the door closing control wires of the coupled trains can be connected correctly only by turning the coupling change-over switches to corresponding positions, which is simple in structure and convenient in operating.

It follows from the first to the third embodiments that, the coupling change-over switch may further include several groups of terminals relating to directional control signals, such as a front pantograph control train control signal, a back pantograph control signal, a left train door all closed interlocking signal, a right train door all closed interlocking signal, a left train door zero speed signal, and a right train door zero speed signal (wires for the signals may be provided or not provided depending on different train circuit control principles). Connections between terminals in each of the group and between the terminals and terminals of related signal wires of the train electric coupler connector are the same as the connections of the terminals of any one of the groups according to the first to the third embodiments.

In the switching circuit of directional train control wires for implementing coupling at a random end of a train according to the first to the third embodiments in the present disclosure, by providing a coupling change-over switch is provided, and by, in coupling trains for running, turning the coupling change-over switch of the coupling end of the host train to the switching position and the coupling change-over switch of the coupling end of the counterpart train to the normal position, or turning the coupling change-over switch of the coupling end of the counterpart train to the switching position and the coupling change-over switch of the coupling end of the host train to the normal position, it can be ensured that directional control signal train wires of forward running and backward running, left door opening, left door closing, right door opening and right door closing of the host train and the counterpart train can be connected correctly, thereby ensuring unified running directions of the two coupled trains and unified sides of opened or closed doors.

The coupling at a random end is described below with reference to FIG. 2 which is a schematic diagram of coupling at a random ends of two trains of 4-car formation.

The coupling at a random end includes the following four cases: a case that a fourth car of a first train is coupled with a first car of a second train, a case that a first car of the first train is coupled with a fourth car of the second train, a case that the fourth car of the first train is coupled with the fourth car of the second train, and a case that the first car of the first train is coupled with the first car of the second train.

Figure 2:
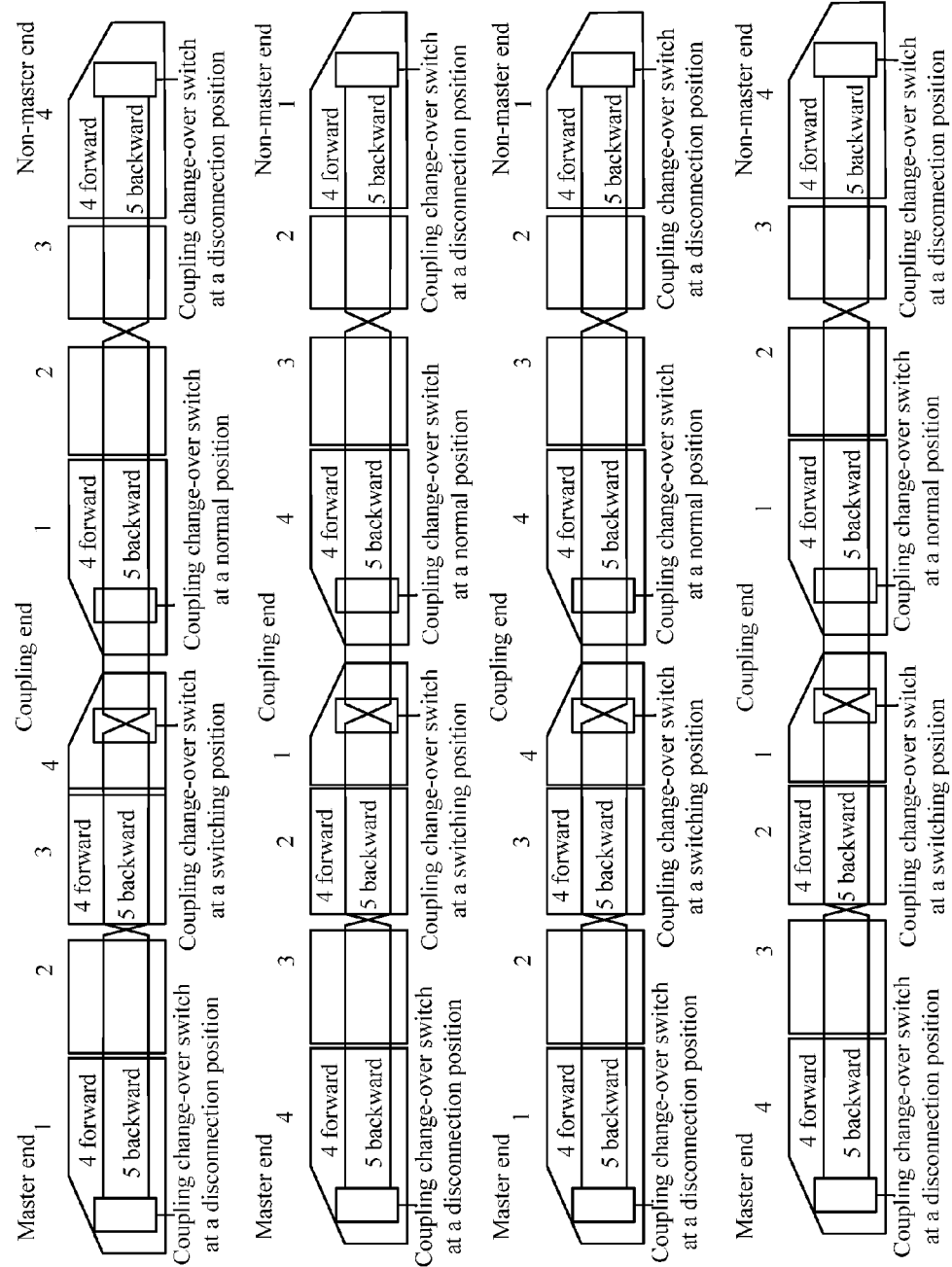
FIG. 2 is a schematic diagram of coupling of two trains of 4-car formation.

For any one of the four cases of coupling shown in FIG. 2, train coupling wires for directional controls of forward running, backward running, left door opening, right door opening, left door closing, right door closing and the like can be connected correctly as long as the head car and tail car of each of trains is provided with the coupling change-over switch, and the coupling change-over switch of a coupling end of a host train is turned to the switching position and the coupling change-over switch of a coupling end of the counterpart train is turned to the normal position, or the coupling change-over switch of the coupling end of the counterpart train is turned to the switching position and the coupling change-over switch of the coupling end of the host train is turned to the normal position.

Also, in the coupling, the coupling change-over switches of non-coupling ends of the host train and the counterpart train each are turned to the disconnection position.

The key point of implementing coupling at a random end of a train is to ensure running directions of the coupled trains are the same, that is, ensuring that the forward running signal wire of the host train is connected to the backward running signal wire of the counterpart train and the backward running signal wire of the host train is connected to the forward running signal wire of the counterpart train. Similarly, in coupling trains, functions of left door opening, right door opening, left door closing, right door closing, front pantograph control, back pantograph control, left train door all closed interlocking, right train door all closed interlocking, left train door zero speed and right train door zero speed are required to be consistent. To achieve the object, only by turning one of the coupling change-over switches of the coupling ends of the two trains to the switching position and turning the other to the normal position, it can be ensured that running directions of the coupled trains are the same and train doors are opened or closed at the same side with respect to the running direction.

The coupling change-over switch is in a lead sealed state (at the disconnection position) before being used. The lead sealing of the coupling change-over switch is considered for safety of control. The lead seal is broken to perform operations if a coupling change-over is required.

Besides, another group of terminals may be added in the coupling change-over switch for another coupling change-over control, such as a front and back pantograph control, a left and right train doors all closed interlocking signal and a left and right train door zero speed signal, which has the same principle as the forward and backward running control, the door opening control and the door closing control.

According to the present disclosure, a coupling change-over switch is provided and designed to have three positions including a disconnection position, a switching position and a normal position, and train coupling wires for directional controls of, for example, forward running, backward running, left door opening, right door opening, left door closing and right door closing are switched with the change-over switch, to achieve coupling at a random end of a train (on condition that an automatic electric coupler is symmetric).

The circuit is simple in structure and convenient in operating, and is practical and reliable, with which flexible coupling at a random end of a train can be achieved.

The embodiments above are only described to explain, rather than limit, the technical solutions in the present disclosure. Though the technical solution is described in detail in conjunction with the embodiments described above, those skilled in the art should understand that modifications may be made to the technical solutions according to the embodiments described above, or equivalent replacements may be made to some technical features, and those modifications or replacements do not make the essence of corresponding technical solutions deviate from the spirit and scope of the technical solutions according to the embodiments in the present disclosure.

The invention claimed is:

1. A switching circuit for implementing coupling at a random end of a train, comprising a coupling change-over switch, wherein the coupling change-over switch comprises a group of terminals A, B C, D, E, F, G and H relating to a train running direction signal, the terminals A and C are connected to each other, and act as a terminal of a forward running signal train control wire, the terminals E and G are connected to each other, and act as a terminal of a backward running signal train control wire, the terminals B and H in the coupling change-over switch are connected to each other, and are connected to a terminal of a forward running signal wire of a train electric coupler connector, and the terminals D and F in the coupling change-over switch are connected to each other, and are connected to a terminal of a backward running signal wire of the train electric coupler connector; and the coupling change-over switch has three positions comprising a switching position, a normal position and a disconnection position, the terminals C and D are connected to each other and the terminals G and H are connected to each other in a case that the coupling change-over switch is turned to the switching position, the terminals A and B are connected to each other and the terminals E and F are connected to each other in a case that the coupling change-over switch is turned to the normal position, and all of the terminals A, B C, D, E, F, G and H are disconnected in a case that the coupling change-over switch is turned to the disconnection position.

2. The switching circuit according to claim 1, wherein the coupling change-over switch further comprises a group of terminals I, J, K, L, M, N, O and P relating to a door opening signal, the terminals I and K are connected to each other, and act as a terminal of a left door opening train control wire, the terminals M and O are connected to each other, and act as a terminal of a right door opening train control wire, the terminals J and P in the coupling change-over switch are connected to each other, and are connected to a terminal of a left door opening signal wire of the train electric coupler connector, and the terminals L and N in the coupling change-over switch are connected to each other, and are connected to a terminal of a right door opening signal wire of the train electric coupler connector; and the terminals K and L are connected to each other and the terminals O and P are connected to each other in a case that the coupling change-over switch is turned to the switching position, the terminals I and J are connected to each other and the terminals M and N are connected to each other in a case that the coupling change-over switch is turned to the normal position, and all of the terminals I, J, K, L, M, N, O and P are disconnected in a case that the coupling change-over switch is turned to the disconnection position.

3. The switching circuit according to claim 2, wherein the coupling change-over switch further comprises a group of terminals Q, R, S, T, U, V, W and X relating to a door closing signal, the terminals Q and S are connected to each other, and act as a terminal of a left door closing train control wire, the terminals U and W are connected to each other, and act as a terminal of a right door closing train control wire, the terminals R and X in the coupling change-over switch are connected to each other, and are connected to a terminal of a left door closing signal wire of the train electric coupler connector, and the terminals T and V in the coupling change-over switch are connected to each other, and are connected to a terminal of a right door closing signal wire of the train electric coupler connector; and the terminals S and T are connected to each other and the terminals W and X are connected to each other in a case that the coupling change-over switch is turned to the switching position, the terminals Q and R are connected to each other and the terminals U and V are connected to each other in a case that the coupling change-over switch is turned to the normal position, and all of the terminals Q, R, S, T, U, V, W and X are disconnected in a case that the coupling change-over switch is turned to the disconnection position.

4. The switching circuit according to claim 1, wherein the coupling change-over switch further comprises several groups of terminals relating to directional control signals, and connections between the terminals in each of the groups and between the terminals and terminals of related signal wires of the train electric coupler connector are the same as the connections of the group of terminals as defined in claim 1.

5. The switching circuit according to claim 4, wherein the directional control signal comprises a front pantograph control signal, a back pantograph control signal, a left train door all closed interlocking signal, a right train door all closed interlocking signal, a left train door zero speed signal and a right train door zero speed signal.

6. The switching circuit according to claim 2, wherein the coupling change-over switch further comprises several groups of terminals relating to directional control signals, and connections between the terminals in each of the groups and between the terminals and terminals of related signal wires of the train electric coupler connector are the same as the connections of the group of terminals as defined in claim 2.

7. The switching circuit according to claim 6, wherein the directional control signal comprises a front pantograph control signal, a back pantograph control signal, a left train door all closed interlocking signal, a right train door all closed interlocking signal, a left train door zero speed signal and a right train door zero speed signal.

8. The switching circuit according to claim 3, wherein the coupling change-over switch further comprises several groups of terminals relating to directional control signals, and connections between the terminals in each of the groups and between the terminals and terminals of related signal wires of the train electric coupler connector are the same as the connections of the group of terminals as defined in claim 3.

9. The switching circuit according to claim 8, wherein the directional control signal comprises a front pantograph control signal, a back pantograph control signal, a left train door all closed interlocking signal, a right train door all closed interlocking signal, a left train door zero speed signal and a right train door zero speed signal.

\* \* \* \* \*